United States Patent
Yang et al.

(10) Patent No.: US 10,523,743 B2
(45) Date of Patent: Dec. 31, 2019

(54) DYNAMIC LOAD-BASED MERGING

(71) Applicant: Alibaba Group Holding Limited, George Town, Grand Cayman (KY)

(72) Inventors: Zhenkun Yang, Hangzhou (CN); Zhidong Sun, Hangzhou (CN); Hu Xu, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 136 days.

(21) Appl. No.: 14/829,132

(22) Filed: Aug. 18, 2015

(65) Prior Publication Data
US 2016/0065663 A1    Mar. 3, 2016

(30) Foreign Application Priority Data
Aug. 27, 2014   (CN) .......................... 2014 1 0429616

(51) Int. Cl.
*H04L 29/08* (2006.01)
*G06Q 10/06* (2012.01)
(Continued)

(52) U.S. Cl.
CPC .......... *H04L 67/1008* (2013.01); *G06F 16/00* (2019.01); *G06F 16/2379* (2019.01);
(Continued)

(58) Field of Classification Search
CPC ............. H04L 67/1008; H04L 67/1095; G06F 16/2379; G06F 16/00; G06F 17/40; G06Q 10/06314
See application file for complete search history.

(56) References Cited

U.S. PATENT DOCUMENTS 4,775,932 A   10/1988 Oxley
6,226,650 B1   5/2001 Mahajan et al.
(Continued)

FOREIGN PATENT DOCUMENTS

JP   2003022209   1/2003
JP   2011175422   9/2011
(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

*Primary Examiner* — Gil H. Lee
*Assistant Examiner* — Javier O Guzman
(74) *Attorney, Agent, or Firm* — Shun Yao; Park, Vaughan, Fleming & Dowler LLP

(57) ABSTRACT

One embodiment of the present invention provides a system for facilitating dynamic load-based merging. During operation, the system identifies incremental data in memory of a first computing device. The incremental data comprises update to reference data in a storage device in a second computing device. If the size of the incremental data becomes greater than a threshold, the system selects a first server group from a plurality of server groups. The second computing device belongs to this first server group. The system then migrates data access requests from the first server group to other server groups in the plurality of server groups and merges the incremental data from the memory of the first computing device to the storage device in the second computing device. The merging includes batch sequential disk writes to the storage device of the second computing device.

21 Claims, 7 Drawing Sheets

(51) Int. Cl.
   *G06F 17/40* (2006.01)
   *G06F 16/23* (2019.01)
   *G06F 16/00* (2019.01)

(52) U.S. Cl.
   CPC ....... *G06F 17/40* (2013.01); *G06Q 10/06314* (2013.01); *H04L 67/1095* (2013.01)

(56) References Cited

U.S. PATENT DOCUMENTS

| | | | |
|---|---|---|---|
| 7,389,379 B1* | 6/2008 | Goel | G06F 11/1662 711/112 |
| 7,565,454 B2 | 7/2009 | Zuberi | |
| 8,260,924 B2 | 9/2012 | Koretz | |
| 8,452,819 B1* | 5/2013 | Sorenson, III | G06F 3/0611 707/809 |
| 8,516,284 B2 | 8/2013 | Chan | |
| 9,092,223 B1 | 7/2015 | Pani | |
| 9,678,861 B2* | 6/2017 | Fair | G06F 12/023 |
| 2002/0010783 A1* | 1/2002 | Primak | G06F 9/505 709/228 |
| 2002/0161890 A1* | 10/2002 | Chen | H04L 29/06 709/226 |
| 2004/0010545 A1 | 1/2004 | Pandya | |
| 2004/0255171 A1 | 12/2004 | Zimmer | |
| 2004/0268278 A1 | 12/2004 | Hoberman | |
| 2005/0038954 A1 | 2/2005 | Saliba | |
| 2005/0097126 A1* | 5/2005 | Cabrera | G06F 16/10 |
| 2005/0177755 A1 | 8/2005 | Fung | |
| 2005/0235171 A1 | 10/2005 | Igari | |
| 2006/0156012 A1 | 7/2006 | Beeson | |
| 2007/0033323 A1 | 2/2007 | Gorobets | |
| 2008/0243847 A1* | 10/2008 | Rasmussen | G06F 17/30171 |
| 2009/0282275 A1 | 11/2009 | Yermalayeu | |
| 2010/0229224 A1 | 9/2010 | Etchegoyen | |
| 2011/0055458 A1 | 3/2011 | Kuehne | |
| 2011/0153903 A1 | 6/2011 | Hinkle | |
| 2011/0231598 A1 | 9/2011 | Hatsuda | |
| 2011/0292538 A1 | 12/2011 | Haga | |
| 2011/0302353 A1 | 12/2011 | Confalonieri | |
| 2012/0117399 A1 | 5/2012 | Chan | |
| 2012/0246392 A1 | 9/2012 | Cheon | |
| 2013/0073798 A1 | 3/2013 | Kang | |
| 2013/0080391 A1* | 3/2013 | Raichstein | G06F 7/00 707/645 |
| 2013/0145085 A1 | 6/2013 | Yu | |
| 2013/0145089 A1 | 6/2013 | Eleftheriou | |
| 2013/0159251 A1* | 6/2013 | Skrenta | G06F 17/30339 707/612 |
| 2013/0166820 A1 | 6/2013 | Batwara | |
| 2013/0173845 A1 | 7/2013 | Aslam | |
| 2013/0290249 A1* | 10/2013 | Merriman | G06F 17/30578 707/610 |
| 2013/0318283 A1 | 11/2013 | Small | |
| 2014/0233950 A1 | 8/2014 | Luo | |
| 2014/0250259 A1 | 9/2014 | Ke | |
| 2014/0310574 A1 | 10/2014 | Yu | |
| 2014/0365707 A1 | 12/2014 | Talagala | |
| 2015/0058289 A1* | 2/2015 | Do | G06F 17/303 707/613 |
| 2015/0082317 A1 | 3/2015 | You | |
| 2015/0106556 A1 | 4/2015 | Yu | |
| 2015/0142752 A1 | 5/2015 | Chennamsetty | |
| 2015/0372597 A1 | 12/2015 | Luo | |
| 2016/0098344 A1 | 4/2016 | Gorobets | |
| 2016/0110254 A1 | 4/2016 | Cronie | |
| 2016/0232103 A1 | 8/2016 | Schmisseur | |
| 2016/0239074 A1 | 8/2016 | Lee | |
| 2016/0239380 A1 | 8/2016 | Wideman | |
| 2016/0343429 A1 | 11/2016 | Nieuwejaar | |
| 2016/0350002 A1 | 12/2016 | Vergis | |
| 2017/0168986 A1 | 6/2017 | Sajeepa | |
| 2017/0353576 A1 | 12/2017 | Guim Bernat | |
| 2018/0024772 A1 | 1/2018 | Madraswala | |
| 2018/0088867 A1 | 3/2018 | Kaminaga | |

FOREIGN PATENT DOCUMENTS

| | | | | |
|---|---|---|---|---|
| WO | 1994018634 | | 8/1994 | |
| WO | 1994018634 A1 | | 8/1994 | |
| WO | WO 9418634 A1 * | | 8/1994 | G06F 17/30073 |

* cited by examiner

DYNAMIC LOAD-BASED MERGING

RELATED APPLICATION

Under 35 U.S.C. 119, this application claims the benefit and right of priority of Chinese Patent Application No. 201410429616.0, filed 27 Aug. 2014.

BACKGROUND

Field

The present application relates to the field of computer technologies, and in particular, to a method and system for data management.

Related Art

With the advancement of the computer and network technologies, various operations performed by the users from different applications lead to extensive storage allocation. For example, multiple users may concurrently shop on an e-commerce website via different applications, such as mobile applications running on different platforms as well as web-interfaces running on different browsers in different operating systems. The corresponding shopping records are stored in storage devices (e.g., in a database) of a system facilitating the e-commerce service.

However, different applications concurrently accessing the system can cause an increasing number of user activities, consequently, an increasing amount of user records are being stored in the system. A large number these records can be accessed by users while they are being updated. Hence, the stored data in the system needs to be continuously managed based on the access and update frequencies of the users. This management of stored data includes allocation of write operations to the data storage such a way that its impact is reduced to users' data access.

Although a number of methods are available for data management in a system, some problems still remain in efficient storage management for concurrent applications.

SUMMARY

One embodiment of the present invention provides a system for facilitating dynamic load-based merging. During operation, the system identifies incremental data in memory of a first computing device. The incremental data comprises update to reference data in a storage device in a second computing device. If the size of the incremental data becomes greater than a threshold, the system selects a first server group from a plurality of server groups. The second computing device belongs to this first server group. The system then migrates data access requests from the first server group to other server groups in the plurality of server groups and merges the incremental data from the memory of the first computing device to the storage device in the second computing device. The merging includes batch sequential disk writes to the storage device of the second computing device.

In a variation of this embodiment, the reference data is divided into a plurality of tablets, wherein a tablet is a non-overlapping segment of the reference data.

In a further variation, a respective server group of the plurality of server groups includes a copy of a respective tablet of the reference data.

In a variation of this embodiment, selecting the first server group from the plurality of server groups includes identifying the first server group from a sequence of server groups.

In a further variation, the system determines whether the merging of the incremental data have been performed for a respective server group and selects a server group for which the merging of the incremental data has not been performed.

In a variation of this embodiment, the system maintains a traffic control table comprising data access request traffic ratio of a respective server group of the plurality of server groups and determines whether the traffic ratio for the first server group has reached a threshold value in the traffic control table. If determined, the system determines the first server group to be ready for the merging.

In a variation of this embodiment, the system determines whether the merging is complete for the first server group. If determined, the system restores data access requests from the other server groups back to the first server group.

In a variation of this embodiment, the system determines whether the first server group is needed to serve data access requests during the merging of the incremental data and determines whether resource consumption by computing devices in the first server group satisfies a condition.

In a further variation, the system determines performance level associated with the data access requests served from the first server group. If the performance level being below a threshold, the system pauses the merging of the incremental data.

In a further variation, the system releases resources occupied by the merging of the incremental data for serving the data access requests.

BRIEF DESCRIPTION OF THE FIGURES

The accompanying drawings herein, which are incorporated herein and constitute a part of the specification, illustrate several exemplary embodiments of the present application and together with the description, serve to illustrate the present application, construing no limitation to the present application. In the drawings.

In the figures, like reference numerals refer to the same figure elements.

DETAILED DESCRIPTION

Figure 1A:
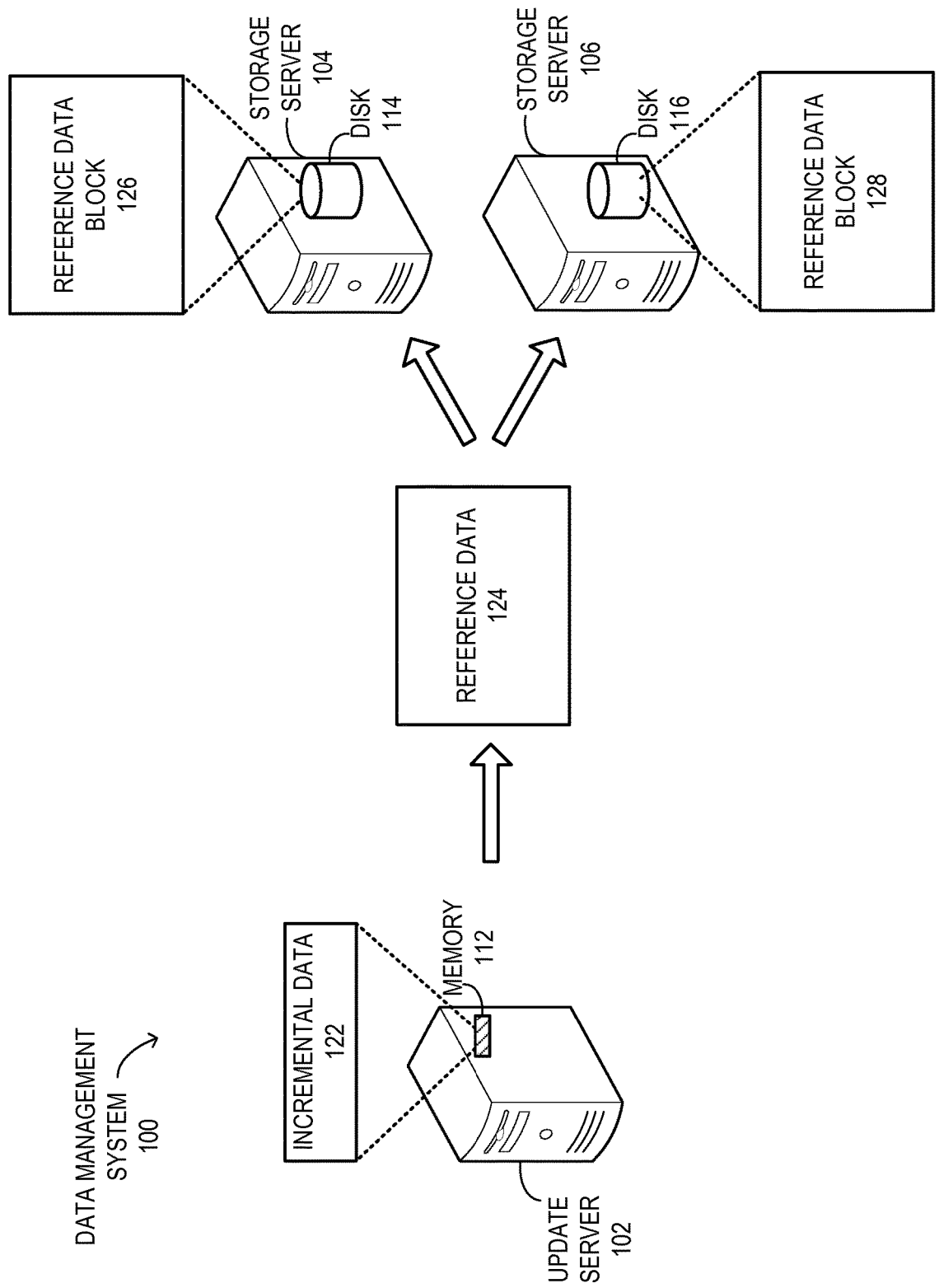
FIG. 1A illustrates exemplary data management based on incremental and reference data, in accordance with an embodiment of the present application.

Embodiments of the present invention solve the problem of efficiently managing data access by diverting data updates from the storage servers being accessed. If data access is unavoidable from those storage servers, data from the storage server is updated when the resources at the storage servers are available.

With existing technologies, data is typically stored in a Log-Structured Merge-Tree (an LSM Tree). In an LSM tree, data are generally divided into multiple levels in memory and storage disk of a system. If data are updated (e.g., due to a user operation), that data are written into the memory of the system. However, data in the memory is volatile. Hence, the system writes the updated data of the memory to a disk file via a merging process. This merging process is usually performed in parallel with data access (i.e., data reading). The merging process is batch sequential disk writes. However, such merging process typically consumes a large quantity of input/output (I/O) resources, and directly affects the throughput and response time of the regular operations (e.g., online services) of the storage system. An online service is a service a system keeps operational. For example, availability and accessibility of a user's purchase records.

To solve this problem, embodiments of the present invention provides a system for dynamic load-based merging process by separating data access and update operations, and automatically diverting data access traffic from storage servers that are being currently updated. The system divides data into two sets of data, reference data and incremental data, for data update (e.g., the write operations) and data access (e.g., the read operations), respectively. Incremental data reside in the memory of an update server, and update operations are performed on the incremental data. On the other hand, reference data are stored in disks of storage servers. Reference data usually have multiple copies in multiple storage servers to facilitate high availability. When the amount of data written into the memory of the update server reaches a threshold, the merging process is triggered. The incremental data in the memory is merged to the reference data on the disk of a corresponding storage server.

Furthermore, to ensure separation of data access from the merging process, the system maintains at least two server groups of storage servers, each set maintaining the entire reference data. When the merging process is performed for a first group, the data access requests are served from a second group. Upon completion of the merging process for the first group, the data access requests are diverted to the first group and the merging process is performed for the second group. As a result, during the merging process, the performance of the data access from the storage servers is not hindered. In some circumstances, due to high volume of data access traffic or a timeout event, some data access requests may be served from a group currently being merged. Under such circumstances, to reduce impact of the merging process, the system monitors the load of the storage servers, and allows the merging process to continue only when the load is low. Otherwise, the system initiates an overload prevention mode and pauses the merging process to recover the resources (e.g., network, processing, and I/O resources) allocated for the merging process.

FIG. 1A illustrates exemplary data management based on incremental and reference data, in accordance with an embodiment of the present application. In this example, a data management system 100 for dynamic load-based data merging is deployed to facilitate separation of data access and update operations. Suppose that the data includes incremental data 122, which resides in memory 112 of an update server 102. In some embodiments, incremental data 122 can be organized in a B-tree. On the other hand, reference data 124 reside on disks 114 and 116 of storage servers 104 and 106, respectively. Reference data is the persistent data stored on the disks and incremental data is the update (e.g., modification, addition, deletion, etc.) to the reference data. Storage servers 104 and 106 can host non-overlapping reference data blocks 126 and 128 of reference data 124, respectively. Data blocks 126 and 128 together represent reference data 124 in their entirety.

System 100 performs the updates (e.g., write operations) to reference data 124 on memory 112 to generate incremental data 122. As a result, during the update process, the write operations are not directly applied to storage servers 104 and 106. Hence, storage servers 104 and 106 can facilitate data access to a client device while reducing the impact of the write operations associated with the data update. When the amount of data written into memory 112 of update server 102 reaches a threshold, system 100 triggers the merging process. The merging process is batch sequential disk writes to disks 114 and/or 116. Thus, the merging process merges the updated data in memory 112 to reference data blocks 126 and/or 128 in disks 114 and/or 116 of storage servers 104 and/or 106, respectively. After the merging process, the updates in incremental data 122 become part of reference data 124. System 100 performs any subsequent updates on memory 122.

Figure 1B:
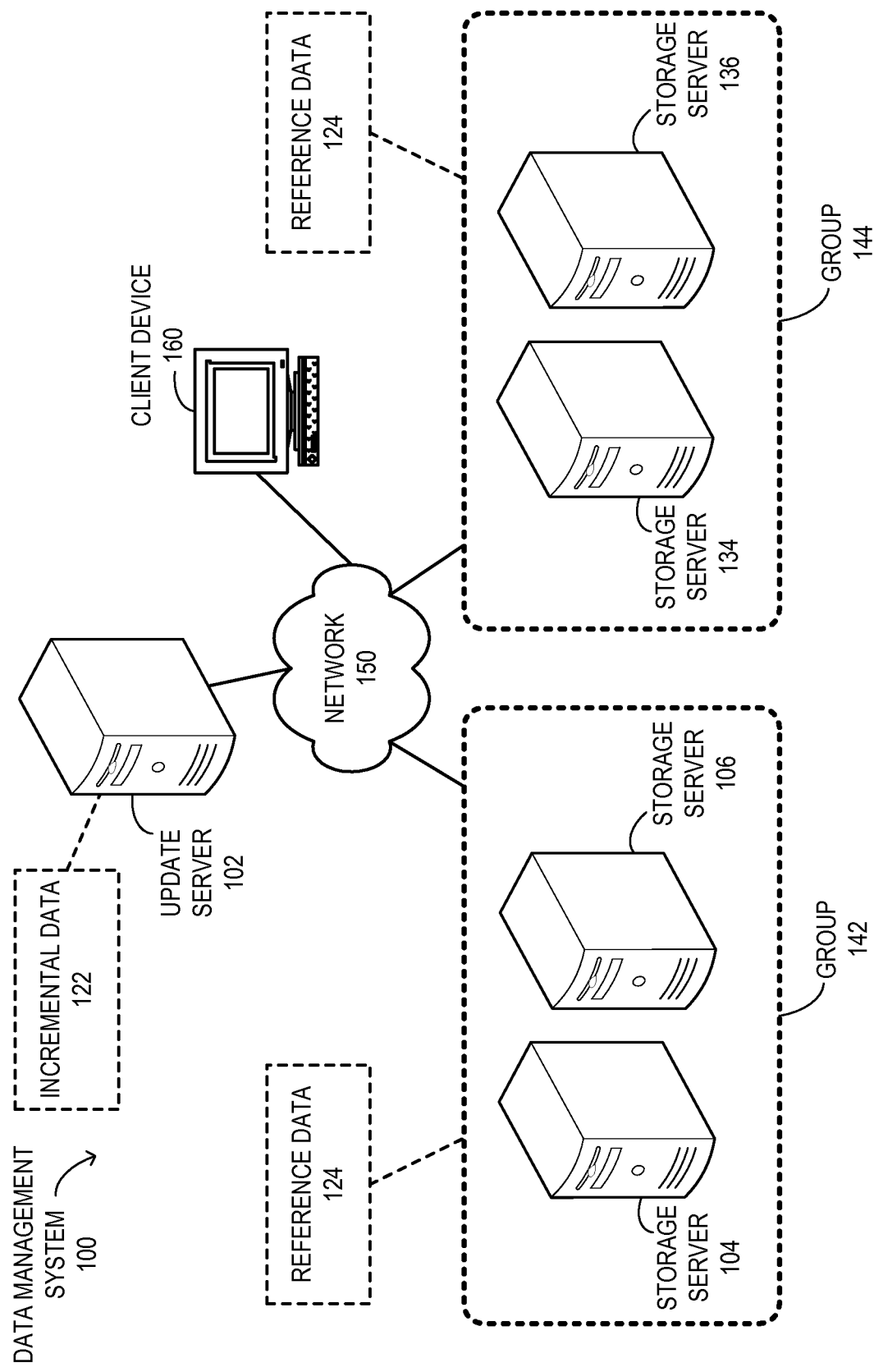
FIG. 1B illustrates an exemplary data management system based on update and storage servers, in accordance with an embodiment of the present application.

In some embodiments, to ensure separation of data access from the merging process, system 100 maintains at least two groups of storage servers, each group maintaining reference data 124 in their entirety. FIG. 1B illustrates an exemplary data management system based on update and storage servers, in accordance with an embodiment of the present application. System 100 can group storage servers 104 and 106 into server group 142. System 100 can maintain another server group 144 comprising storage servers 134 and 136. Both groups 142 and 144 host reference data 124 in their entirety. This allows load balancing among the groups and separates data access from the merging process. In some embodiments, groups 142 and 144 can be in separate locations, separated by network 150 (e.g., a local or wide area network). Update server 102 can be coupled to groups 142 and 144 via network 150.

System 100 ensures separation of data access and the merging process between groups 142 and 144. System 100 uses groups 142 and 144 as the control units for the merging process and performs the merging process at different times. In the preparation stage of the merging process, system 100 selects a group for the merging process and migrates data access traffic (e.g., data access requests and/or corresponding data) to the other groups. In this way, the merging process and the online services are isolated from each other. When system 100 performs the merging process for group 142, system 100 diverts the data access traffic to group 144. For example, if client device 160 sends a data access request (e.g., request for a customer record), the data access request is served from group 144 (e.g., a corresponding storage server provides the requested data). After system 100 completes the merging process for group 142, system 100 migrates the data access traffic to group 142 and initiates the merging process for group 144. A subsequent request for data access from client device 160 is served from group 142. This merging process can be referred to as an off-peak merging process. The off-peak merging process reduces the impact of the merging of incremental data on the performance of the online services (e.g., the time taken for a storage server to serve a data access request).

In some embodiments, system 100 switches between groups 142 and 144 based on a traffic control table, which includes the data access traffic ratio between groups 142 and

144. The requests for data access from client devices (e.g., client device 160) are distributed to groups 142 and 144 based on the ratio. System 100 gradually migrates data access traffic from one group to another. In this way, the traffic ratio continues to increase for one group and decrease in another. For example, at one given time, if the ratio is 50:50, system 100 forwards 50% of the data access request to group 142 and the other 50% to group 144. If the merging process is needed, system 100 starts migrating data access traffic from one group to another based on a sequence (e.g., group 142 first, group 144 second). As a result, the traffic ratio between groups 142 and 144 continues to change. When the traffic ratio becomes zero for a group, that group becomes ready for the merging process. For example, when the traffic ratio for group 142 becomes zero, system 100 is forwarding a respective data access request to group 144. Hence, group 142 becomes ready for the merging process.

In the same way, when system 100 completes the merging process for group 142, system 100 gradually migrates data access traffic from group 144 to group 144. As a result, the traffic ratio between groups 142 and 144 starts to change in the opposite direction. When traffic ratio for group 144 becomes zero, system 100 is forwarding a respective data access request to group 142. Hence, group 144 becomes ready for the merging process. In some embodiments, update server 102 determines whether incremental data 122 have been merged to reference data 124 in a respective group (groups 142 and 144 in this example). If incremental data 122 have not been merged to reference data 124 in one or more of groups 142 and 144, system 100 selects a group which currently needs a merging. Suppose that the merging process has been completed for group 142 and not for group 144. System 100 then selects group 144 for merging. When incremental data 122 becomes merged to reference data 124 in both groups 142 and 144, system 100 can remove incremental data 122 from memory 112 of update server 102.

In some scenarios, the off-peak merging process cannot be applicable. In one such scenario, a time out event can occur for the merging process for a group. For example, the allocated time for the merging process for group 142 can pass without completion of the merging process. As a result, system 100 may start diverting traffic from group 144 to group 142. In another such scenario, during the merging process for group 142, group 144 may not be able to serve all the data access requests. Hence, system 100 may forward some data access requests to group 142, even during the merging process, to ensure the maximum availability of the online services (e.g., accessibility of data).

In these two scenarios, data access and the merging process may not be isolated between groups 142 and 144. In some embodiments, system 100, to effectively reduce the impact of the merging process on the data access, monitors the load of the storage servers of a respective group. If the load reaches a threshold, system initiates an overload prevention mode. In this mode, system 100 pauses the merging process, and frees the resources allocated for the merging process. For example, if a merging process is executed by a merging thread, system 100 pauses the operations of the thread and frees the resources, such as network, processing, and I/O resources, allocated for that thread. When system 100 detects the load to be low, system 100 can resume the merging process. In this way, system 100 provides the online services a higher priority than the merging operations, thereby ensuring quality of service (QoS) for client devices' data access requests.

Figure 2:
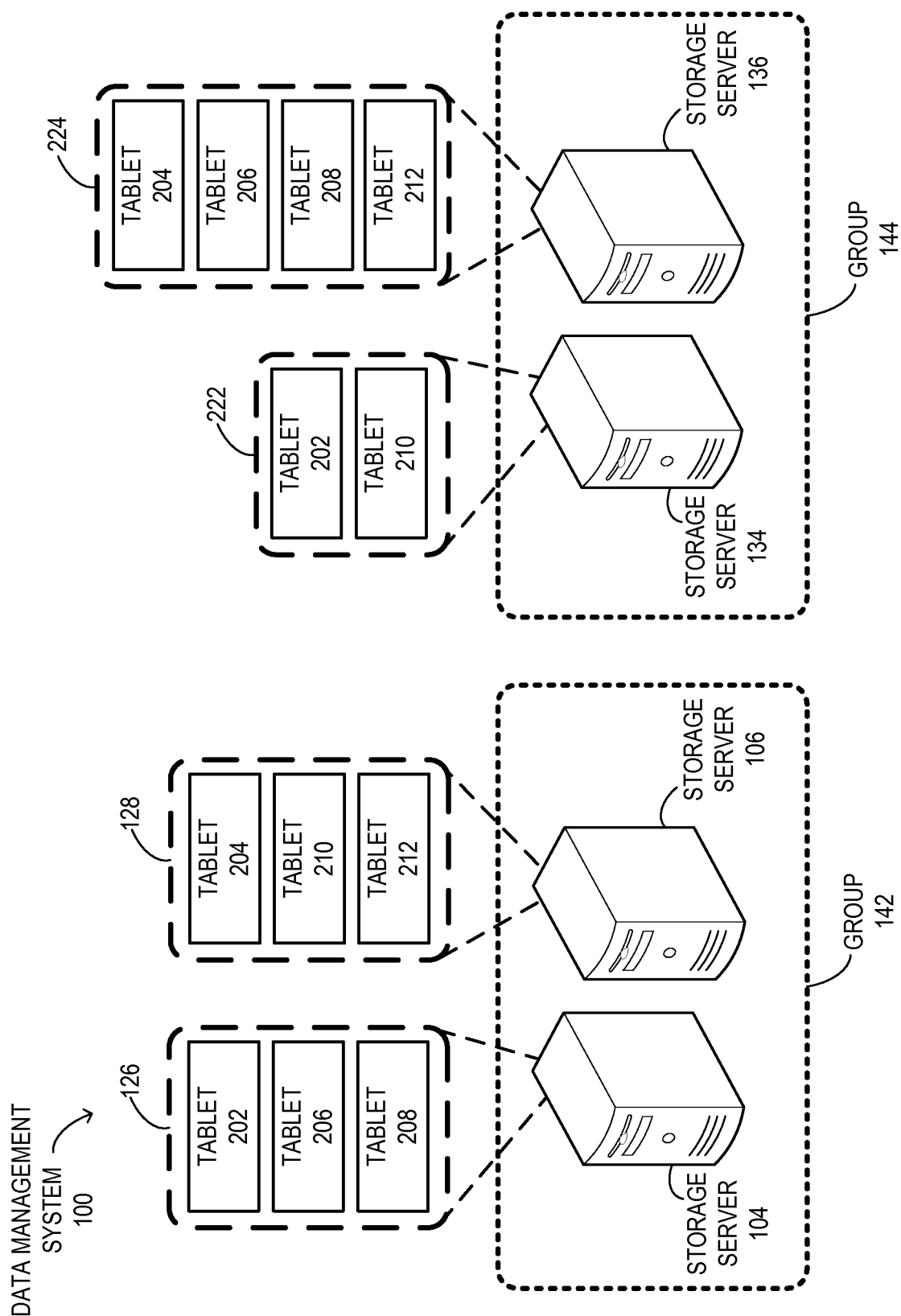
FIG. 2 illustrates exemplary tablets of the reference data, in accordance with an embodiment of the present application.

FIG. 2 illustrates exemplary tablets of the reference data, in accordance with an embodiment of the present application. In this example, reference data 124 are divided into a plurality of non-overlapping data segments. Such a data segment can be referred to as a tablet. A data block in a storage server can include one or more tablets. For example, tablets 202, 206, and 208 of reference data 124 are in data block 126 hosted in storage server 104, and tablets 204, 210, and 212 of reference data 124 are in data block 128 hosted in storage server 106.

To ensure high availability and separation of the merging process, these tablets are also hosted in group 144. Tablets 202 and 210 are in data block 222 hosted in storage server 134, and tablets 204, 206, 208, and 212 are in data block 224 hosted in storage server 136. In other words, reference data 124, in its entirety, is divided into non-overlapping tablets 202, 204, 206, 208, 210, and 212, and each of the tablets is stored in a plurality of storage servers in different groups. It should be noted that, though each group includes a respective tablet of reference data 124, a group may host one copy of a tablet. As a result, a group can include one subset of the set of all copies of all tablets.

In some embodiments, system 100 uses compartmentalization of updated data (i.e., write operations) to avoid race condition. When the amount of data written in memory 112 of update server 102 reaches a threshold, system 100 isolates that amount of data for a merging process from any subsequent updates. In this way, during the merging process, system 100 ensures that the same set of updates is merged to reference data 124 in each group. System 100 can also use a distributed commit to avoid race condition among the groups. When the merging process is completed, system 100 receives a confirmation from a corresponding storage server that the merging process for that server has completed. Upon receiving confirmations from a respective storage server in both groups 142 and 144, system 100 commits the updates to a respective storage server. Otherwise, system 100 can roll back to the previously committed reference data in a respective storage server. This prevents data mismatch between storage servers and groups due to an unsuccessful merging process.

Figure 3A:
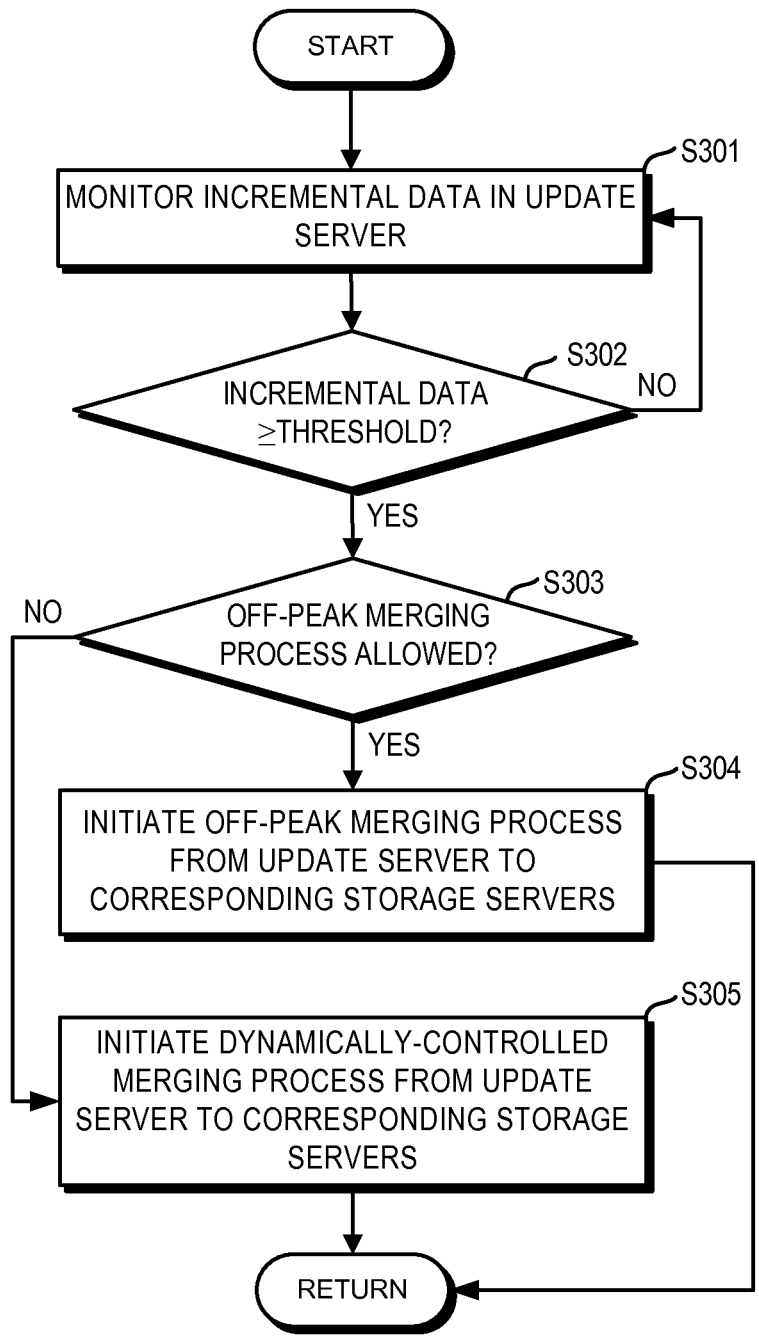
FIG. 3A presents a flowchart illustrating a data management system initiating the merging process, in accordance with an embodiment of the present application.

FIG. 3A presents a flowchart illustrating a data management system initiating the merging process, in accordance with an embodiment of the present application. During operation, the system monitors the incremental data in the update server (operation S301). The system checks whether the incremental data, which are written in the memory of the update server, is greater than or equal to (or greater than) a threshold (operation S302). The quantity of the incremental data can be based on a number of bytes written in the memory. If the incremental data is not greater than or equal to the threshold, the system continues to monitor the incremental data (operation S301). If the incremental data is greater than or equal to the threshold, the incremental data is ready for a merging process. The system then checks whether an off-peak merging process is allowed (operation S303).

The system checks the load on the storage servers of a respective group and the timeout events of previous merging operations to determine whether the off-peak merging process is allowed. If off-peak merging process is allowed, the system initiates an off-peak merging process from the update server to the corresponding storage servers (operation S304). Otherwise, the system initiates a dynamically-controlled merging process from the update server to the corresponding storage servers (operation S305). It should be noted that, even though FIG. 3A illustrates only one iteration of the merging process, the system continues to monitor the incremental data (operation S301) in the update server after completion of the merging process. This ensures that whenever the amount of data written the in the memory reaches the threshold, the system initiates the merging process.

Figure 3B:
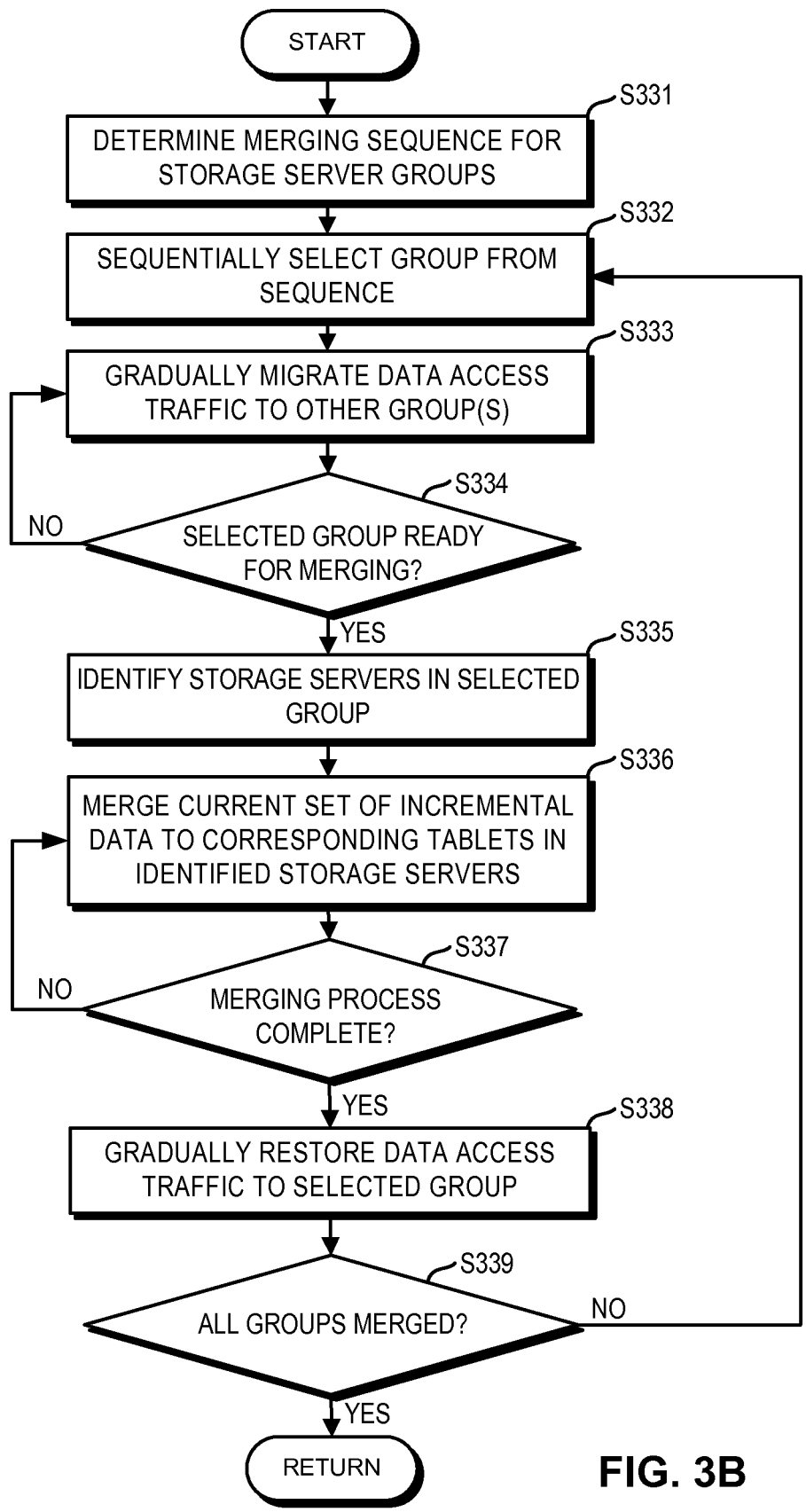
FIG. 3B presents a flowchart illustrating the off-peak merging process of a data management system, in accordance with an embodiment of the present application.

FIG. 3B presents a flowchart illustrating the off-peak merging process of a data management system, in accordance with an embodiment of the present application. During operation, the system determines a merging sequence (or merging order) for the storage server groups (operation S331). In the example in FIG. 1B, the merging sequence can be group 142 first and group 144 second, or group 144 first and group 142 second. The system then sequentially selects a group from the sequence (operation S332). For example, if the sequence indicates group 142 first, system 100 selects group 142. The system gradually migrate data access traffic to other group(s) (operation S333) (e.g., to group 144).

The system checks whether the selected group is ready for merging (operation S334). In some embodiments, the system maintains a traffic control table which includes the data access traffic ratio of a respective group. If the traffic ratio for the selected group becomes zero, the system considers the selected group to be ready for the merging process. If the selected group is not ready for merging, the system continues to gradually migrate data access traffic to other group(s) (operation S333). If the selected group is ready for merging, the system identifies the storage servers in the selected group (operation S335). The system merges the incremental data to the corresponding tablets in the identified storage servers (operation S336). For example, if a part of incremental data 122 includes updates to the reference data segment in tablet 202, system 100 merges that part of incremental data 122 with tablet 202 in storage server 104.

The system checks whether the merging process is complete for the selected group (operation S337). For example, if a part of incremental data 122 includes updates to the reference data segments in tablets 202, 204, 210, and 212, when system 100 completes merging incremental data 122 with tablets 202, 204, 210, and 212 hosted in group 142 (or group 144), the merging process is complete for group 142. If the merging process is not complete, the system continues to merge the current set of incremental data to the corresponding tablets in the identified storage servers (operation S336). This allows compartmentalization of the incremental data during the merging process. Any subsequent incremental data is merged in the next merging process. If the merging process is complete, the system gradually restores data access traffic to the selected group (operation S338). The system then checks whether all groups have been merged (operation S339). If not, the system sequentially selects the next group from the sequence (operation S332).

Figure 3C:
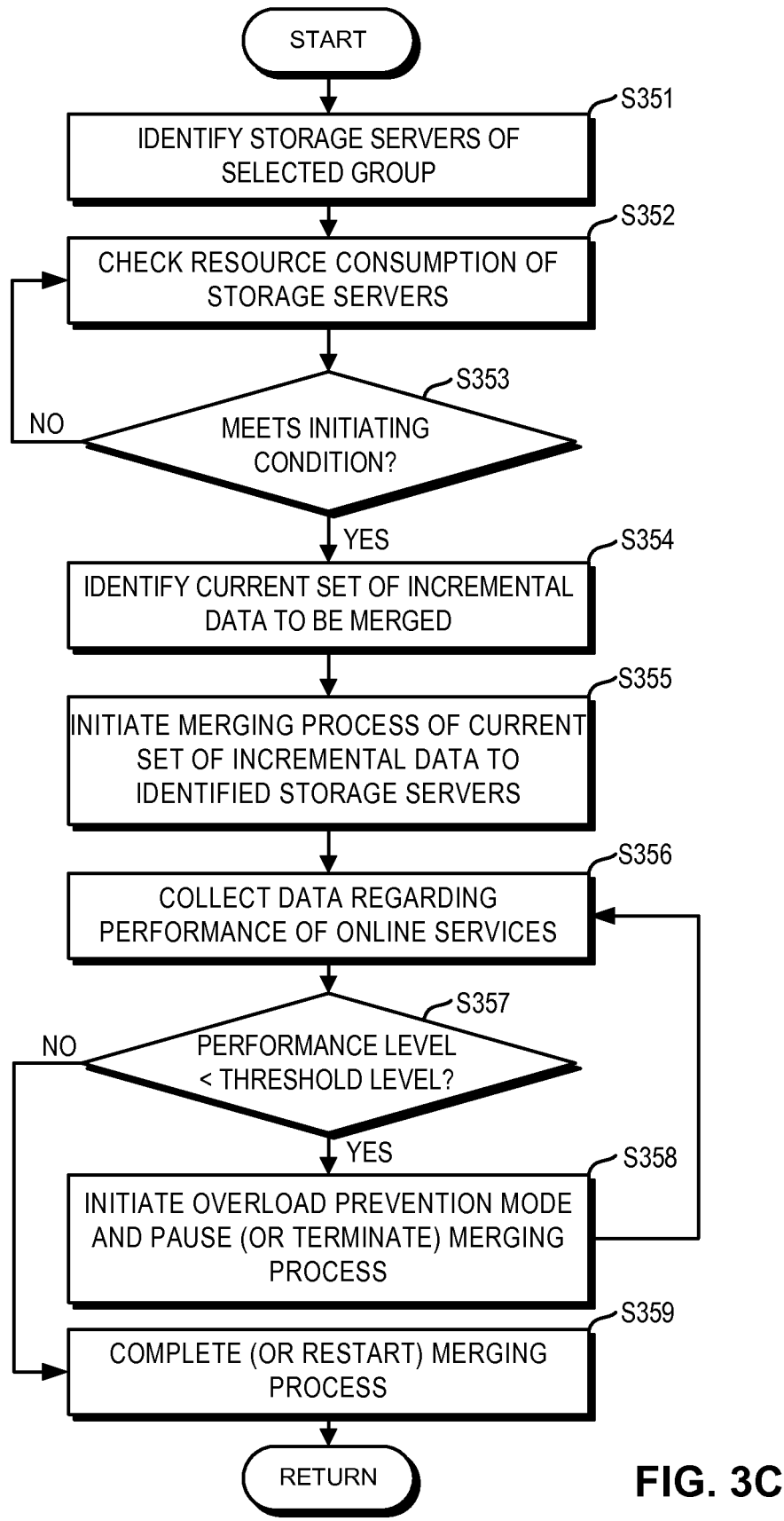
FIG. 3C presents a flowchart illustrating the dynamically-controlled merging process of a data management system, in accordance with an embodiment of the present application.

FIG. 3C presents a flowchart illustrating the dynamically-controlled merging process of a data management system, in accordance with an embodiment of the present application. During operation, the system identifies the storage servers of a selected group (operation S351). The system can select the group based on the current traffic load or available resources. The system checks the resource consumption of the storage servers (operation S352) and checks whether the resource consumption meets the initiating condition of a merging process (operation S353). The initiating condition can be whether the resource consumption matches a threshold. Examples of such resources include, but are not limited to, network resources, processing resources (e.g., Central Processing Unit (CPU) cycles), and I/O resources.

If the resource consumption does not meet the initiating condition, the system continues to check the resource consumption of the storage servers (operation S352). If the resource consumption meets the initiating condition, the system identifies the current set of incremental data to be merged (operation S354). Since the merging process is done only for the current set of incremental data, the resource allocation for the merging process is done for that current set. For example, if the merging process is executed using a merging thread, the merging thread is only issued for the current set of incremental data, and the system allocates resources only for that set. The system issues the next merging thread for the next set of incremental data and, accordingly, allocates the resources for that next thread. This "one-by-one" approach ensures that the next merging thread is only issued if the load on the storage servers is low.

Upon identifying the current set of incremental data to be merged, the system then initiates the merging process of the current set of incremental data to the identified storage servers (operation S355). The system collects data regarding the performance of the online services (operation S356). Examples of such data include, but are not limited to, request throughput, response latency, and request queuing. The system checks whether the performance level of the online services is below a corresponding threshold level (operation S357). For example, the system can check whether the response latency is greater than a threshold time and/or the length of the request queue is greater than a threshold length.

If the performance level is below the threshold level, the system initiates an overload prevention mode and pauses the merging process (operation S358) and continues to collect data regarding the performance of the online services (operation S356). In some embodiments, the system terminates the merging process in the overload prevention mode. If the performance level is not below the threshold level, the merging process is not severely hindering the performance level of the online services. The system then completes (e.g., resumes) the merging process for the current set of incremental data (operation S359). However, if the system has terminated the merging process in the overload prevention mode, the system can restart the merging process when the performance level of the online services is no longer below the threshold level.

Figure 4:
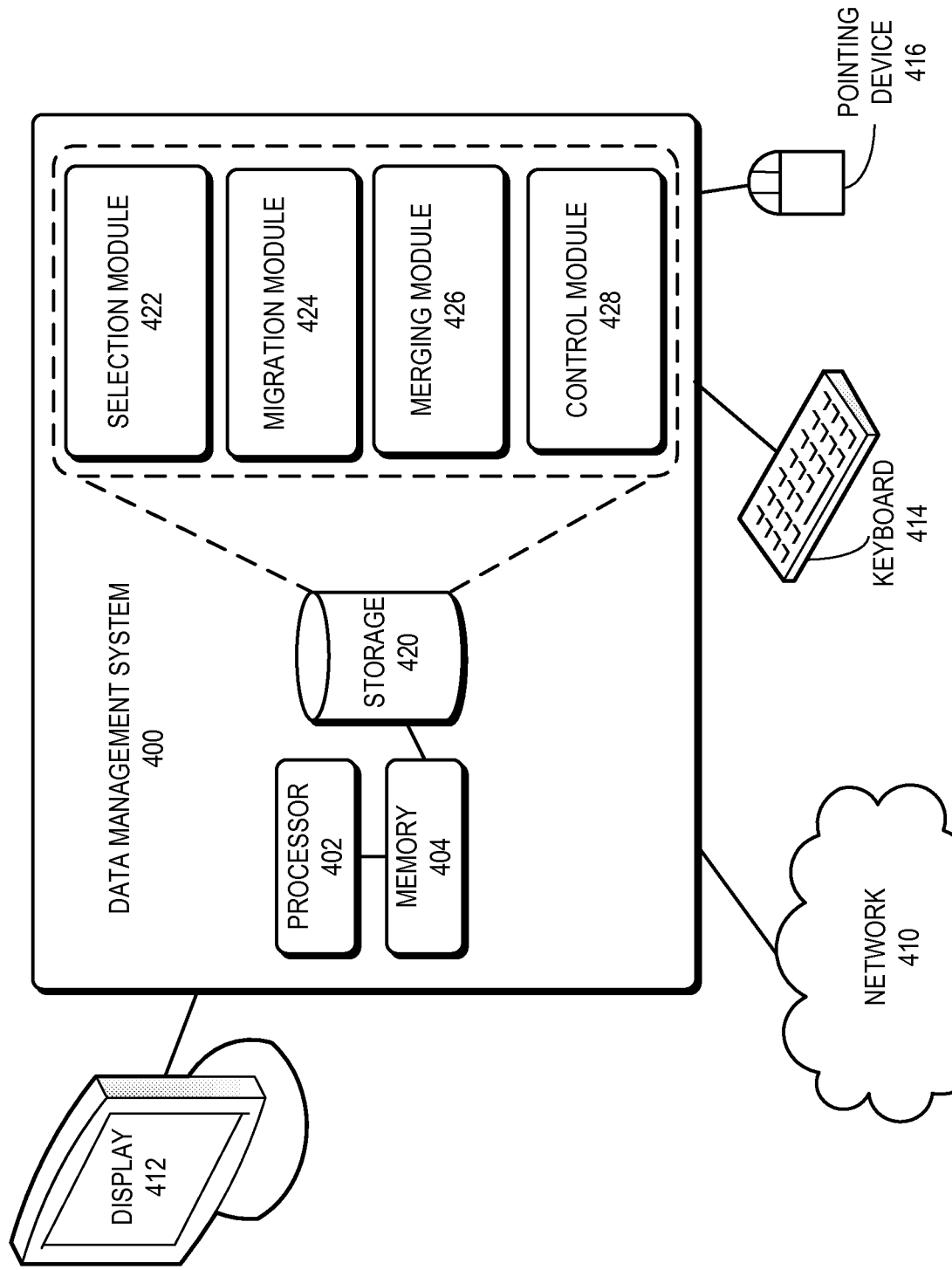
FIG. 4 is a schematic structural diagram of an exemplary data management system, in accordance with an embodiment of the present application.

FIG. 4 is a schematic structural diagram of an exemplary data management system, in accordance with an embodiment of the present application. A data management system 400 includes a processor 402, a memory 404, and a storage device 420. Storage device 420 typically stores instructions that can be loaded into memory 404 and executed by processor 402 to perform the methods described above. In one embodiment, the instructions in storage 420 can implement a selection module 422, a migration module 424, a merging module 426, and a control module 428, all of which can communication with each other through various means.

In some embodiments, modules 422, 424, 426, and 428 can be partially or entirely implemented in hardware and can be part of processor 402. Further, in some embodiments, the system may not include a separate processor and memory. Instead, in addition to performing their specific tasks, modules 422, 424, 426, and 428, either separately or in concert, may be part of special-purpose computation engines.

Storage 420 stores programs to be executed by processor 402. Specifically, storage 420 stores a program that implements a system (application) for efficient data management using dynamic load-based merging. During operation, the application program can be loaded from storage 420 into memory 404 and executed by processor 402. As a result, system 400 can perform the functions described above. System 400 can be further coupled to an optional display 412, a keyboard 414, and a pointing device 416, and can be coupled via one or more network interfaces to a network 410.

During operation, selection module 422 maintains the sequence of groups, and selects a group from the sequence. Selection module 422 selects a storage server that needs the merging process. Selection module 422 also determines whether the merging process has been performed for a group or not. Migration module 424 migrates data access traffic from the selected group to other groups. In some embodiments, migration module 424 maintains a traffic control table for the groups. When the traffic ratio for a group becomes zero, migration module 424 determines that the group is ready for the migration process. Upon completion of the merging process, migration module 424 restores the data access traffic back to the group.

Merging module 426, after the data access traffic is migrated off the selected group, merges the incremental data from updating server to one or more tablets of the reference data in a storage server. Control module 428, during the merging process, determines whether any data access traffic should be processed by the group currently being merged. Control module 428, if the resource consumption condition meets an initiating condition, can initiate the dynamically-controlled merging process for that group, as described in conjunction with FIG. 3C. For example, control module 424 can pause (or terminate), and resume (or restart) the merging process, if needed.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for facilitating dynamic load-based merging, the method comprising:
    storing reference data in respective storage devices in a plurality of server groups, wherein a respective server group includes a plurality of storage devices;
    in response to determining that the reference data has been updated with incremental data, storing the incremental data in a memory of a first computing device distinct from the plurality of server groups, wherein the incremental data comprises an update to the reference data, which is stored in a storage device in a second computing device, and wherein the second computing device belongs to a first server group of the plurality of server groups;
    in response to a size of the incremental data in the memory of the first computing device being greater than a threshold size, selecting the first server group from the plurality of server groups for merging the incremental data;
    in response to selecting the first server group for merging the incremental data, migrating data access requests for the reference data from the first server group to a second server group in the plurality of server groups;
    determining a traffic ratio of data access requests to the first server group with respect to data access requests to the plurality of server groups; and
    in response to the traffic ratio reaching a threshold value, merging the incremental data from the memory of the first computing device with the reference data stored in the storage device in the second computing device using disk writes.

2. The method of claim 1, wherein the reference data is divided into a plurality of tablets, wherein a tablet is a non-overlapping segment of the reference data.

3. The method of claim 2, wherein a respective server group of the plurality of server groups stores a copy of each tablet of the plurality of tablets.

4. The method of claim 1, wherein selecting the first server group from the plurality of server groups includes identifying the first server group based on a sequence of the plurality of server groups.

5. The method of claim 4, further comprising:
    determining whether the merging of the incremental data have been performed for a respective server group of the plurality of server groups; and
    selecting, based on the sequence of the plurality of server groups, a server group for which the merging of the incremental data has not been performed.

6. The method of claim 1, further comprising:
    maintaining the traffic ratio in a data structure.

7. The method of claim 1, further comprising:
    determining whether the merging of the incremental data is complete for the first server group; and
    in response to determining that the merging of the incremental data is complete for the first server group, migrating data access requests for the reference data from the second server group to the first server group.

8. The method of claim 1, further comprising:
    determining whether the first server group is needed to serve a data access request during the merging of the incremental data; and
    determining resource consumption by one or more computing devices in the first server group.

9. The method of claim 8, further comprising:

determining a performance level associated with the data access requests served from the first server group; and in response to the performance level being below a threshold level, pausing the merging of the incremental data.

10. The method of claim 9, further comprising releasing resources allocated for the merging of the incremental data for serving the data access requests.

11. A non-transitory storage medium storing instructions, which when executed by a processor cause the processor to perform a method for facilitating dynamic load-based merging, the method comprising:

storing reference data in respective storage devices in a plurality of server groups, wherein a respective server group includes a plurality of storage devices;

in response to determining that the reference data has been updated with incremental data, storing the incremental data in a memory of a first computing device distinct from the plurality of server groups, wherein the incremental data comprises an update to the reference data, which is stored in a storage device in a second computing device, and wherein the second computing device belongs to a first server group of the plurality of server groups;

in response to a size of the incremental data in the memory of the first computing device being greater than a threshold size, selecting the first server group from the plurality of server groups for merging the incremental data;

in response to selecting the first server group for merging the incremental data, migrating data access requests for the reference data from the first server group to a second server group in the plurality of server groups; and determining a traffic ratio of data access requests to the first server group with respect to data access requests to the plurality of server groups; and in response to the traffic ratio reaching a threshold value, merging the incremental data from the memory of the first computing device with the reference data stored in the storage device in the second computing device using disk writes.

12. The non-transitory storage medium of claim 11, wherein the reference data is divided into a plurality of tablets, wherein a tablet is a non-overlapping segment of the reference data.

13. The non-transitory storage medium of claim 12, wherein a respective server group of the plurality of server groups stores a copy of each tablet of the plurality of tablets.

14. The non-transitory storage medium of claim 11, wherein selecting the first server group from the plurality of server groups includes identifying the first server group based on a sequence of the plurality of server groups.

15. The non-transitory storage medium of claim 14, wherein the method further comprises:

determining whether the merging of the incremental data have been performed for a respective server group of the plurality of server groups; and selecting, based on the sequence of the plurality of server groups, a server group for which the merging of the incremental data has not been performed.

16. The non-transitory storage medium of claim 11, wherein the method further comprises:

maintaining the traffic ratio in a data structure.

17. The non-transitory storage medium of claim 11, wherein the method further comprises:

determining whether the merging of the incremental data is complete for the first server group; and in response to determining that the merging of the incremental data is complete, migrating data access requests for the reference data from the second server group to the first server group.

18. The non-transitory storage medium of claim 11, wherein the method further comprises:

determining whether the first server group is needed to serve a data access request during the merging of the incremental data; and determining resource consumption by one or more computing devices in the first server group.

19. The non-transitory storage medium of claim 18, wherein the method further comprises:

determining a performance level associated with the data access requests served from the first server group; and in response to the performance level being below a threshold level, pausing the merging of the incremental data.

20. The non-transitory storage medium of claim 19, wherein the method further comprises releasing resources allocated for the merging of the incremental data for serving the data access requests.

21. A computing system for facilitating dynamic load-based merging, the computing system comprising:

a processor;

a memory coupled to the processor and storing instructions, which when executed by the processor cause the processor to perform a method, the method comprising:

storing reference data in respective storage devices in a plurality of server groups, wherein a respective server group includes a plurality of storage devices;

in response to determining that the reference data has been updated with incremental data, storing the incremental data in a memory of a first computing device distinct from the plurality of server groups, wherein the incremental data comprises an update to the reference data, which is stored in a storage device in a second computing device, and wherein the second computing device belongs to a first server group of the plurality of server groups;

in response to size of the incremental data in the memory of the first computing device being greater than a threshold size, selecting the first server group from the plurality of server groups for merging the incremental data;

in response to selecting the first server group for merging the incremental data, migrating data access requests for the reference data from the first server group to a second server group in the plurality of server groups;

determining a traffic ratio of data access requests to the first server group with respect to data access requests to the plurality of server groups; and in response to the traffic ratio reaching a threshold value, merging the incremental data from the memory of the first computing device with the reference data stored in the storage device in the second computing device using disk writes.

* * * * *